(12) United States Patent
Shibasaki et al.

(10) Patent No.: US 8,859,038 B2
(45) Date of Patent: Oct. 14, 2014

(54) METHOD FOR MONITORING CORROSION PROTECTION IN POWER PLANT

(75) Inventors: Osamu Shibasaki, Yokohama (JP); Masato Okamura, Yokohama (JP); Koji Negishi, Yokohama (JP); Seiji Yamamoto, Tokyo (JP); Toyoaki Miyazaki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/219,952

(22) Filed: Aug. 29, 2011

(65) Prior Publication Data

US 2012/0064242 A1   Mar. 15, 2012

(30) Foreign Application Priority Data

Sep. 15, 2010 (JP) ................. P2010-206960

(51) Int. Cl.
| | | |
|---|---|---|
| *B05D 7/22* | (2006.01) | |
| *G21C 17/022* | (2006.01) | |
| *C23C 8/02* | (2006.01) | |
| *C23F 11/18* | (2006.01) | |
| *C23C 8/18* | (2006.01) | |
| *C23C 8/14* | (2006.01) | |
| *C09D 5/08* | (2006.01) | |

(52) U.S. Cl.
CPC .............. *G21C 17/0225* (2013.01); *C23C 8/02* (2013.01); *C23F 11/185* (2013.01); *C23C 8/18* (2013.01); *C23C 8/14* (2013.01)
USPC .......................................... 427/230; 427/239

(58) Field of Classification Search
CPC .................................... B05D 7/22; C09D 5/08
USPC .................. 427/230–239; 106/14.05
See application file for complete search history.

(56) References Cited

U.S. PATENT DOCUMENTS

| | | | | |
|---|---|---|---|---|
| 3,963,530 | A * | 6/1976 | Smollett et al. ................ | 428/336 |
| 4,211,565 | A * | 7/1980 | Hund et al. ................. | 106/14.05 |
| 5,608,766 | A | 3/1997 | Andresen et al. | |
| 5,797,357 | A | 8/1998 | Kawachi et al. | |
| 2012/0028038 | A1 * | 2/2012 | Okamura et al. ............. | 428/336 |
| 2012/0039429 | A1 | 2/2012 | Shibasaki et al. | |

FOREIGN PATENT DOCUMENTS

| | | |
|---|---|---|
| DE | 150 080 | 8/1981 |
| DE | 695 07 106 T2 | 7/1999 |
| DE | 198 42 930 | 3/2000 |
| EP | 0 708 295 A1 | 4/1996 |
| JP | 6-304459 | 11/1994 |
| JP | 8-178207 | 7/1996 |
| JP | 11-236689 | 8/1999 |
| JP | 2002-5411 | 1/2002 |
| JP | 2007-131913 | 5/2007 |
| JP | 2008-007851 | 1/2008 |
| JP | 2009-082345 | * 3/2009 |
| RU | 2271410 C2 | 3/2006 |
| WO | WO 2007/025297 | 3/2007 |
| WO | WO 2010/090307 | 8/2010 |
| WO | WO 2010/113814 A1 | * 10/2010 |

OTHER PUBLICATIONS

Satoh et al., "Corrosion of stainless steel in high temperature water containing H202," Proceedings of 15th International Conference on the Properties of Water and Steam, Berlin, Germany, 2008, 10 pages.*
Machine translation of WO 2010/113814 A1, generated Feb. 22, 2014, 7 pages.*
Russian Office Action issued Nov. 13, 2012 in Patent Application No. 2011137877 with English Translation.
A. Yu. Ishlinsky, "Polytechnic Dictionary", M. Soviet Encyclopedia, 1989, p. 480.
Office Action issued Mar. 27, 2013, in Australian patent application No. 2011218739.
Office Action issued Jun. 10, 2013, in Canadian patent application No. 2,751,341.
Satoh et al, "Corrosion of stainless steel in high temperature water containing $H_2O_2$", Proceedings of 15th International Conference on the Properties of Water and Steam, Berlin, Germany, 2008.
Office Action issued Aug. 1, 2013, in Chinese patent application No. 201110274137.2 (w/English translation).
Ge Hong Hua et al, "Advances in Anti-corrosion Technology for Electric Power Equipment", *Corrosion & Protection*, vol. 30, No. 9, (Sep. 2009), pp. 611-619.
Office Action issued Mar. 18, 2014, in Japanese patent application No. 2010-206960 (w/ English translation).
Office Action issued Apr. 15, 2014, in Chinese patent application No. 201110274137.2 (w/ English translation).
Office Action issued Apr. 22, 2014, in German patent application No. 102011082581.9 (w/English translation).
Matsushima et al, "Reduction of Feedwater Corrosion by Controlled Oxygen Gas Injection at Shimane Nuclear Power Station, Chugoku Electric Power Co. Inc." (Feb. 1981) pp. 47-54 (w/ Japanese equivalent).

* cited by examiner

*Primary Examiner* — William Phillip Fletcher, III
(74) *Attorney, Agent, or Firm* — Oblon, Spivak, McClelland, Maier & Neustadt, L.L.P.

(57) ABSTRACT

Provided is a method for monitoring corrosion in a power plant, including: forming a film with a composition of $M1FeO_3$ (M1 is a trivalent or tetravalent metal) or $M2Fe_2O_4$ (M2 is a divalent metal) on the inner wall surface of an apparatus of the power plant; and maintaining the film stably by controlling the amount of introduction of oxygen into the apparatus commensurate with a temperature in the apparatus.

6 Claims, 2 Drawing Sheets

//(1,2)

METHOD FOR MONITORING CORROSION PROTECTION IN POWER PLANT

CROSS-REFERENCE TO RELATED APPLICATION

This application is based upon and claims the benefit of priority from Japanese Patent Application No. 2010-206960 filed on Sep. 15, 2010, the entire contents of which are incorporated herein by reference.

FIELD

Embodiments described herein relate generally to a method for monitoring corrosion protection in a power plant.

BACKGROUND

Corrosion is aging degradation that a metal structural material of an apparatus dissolves as ions into an environment, and important element that decides the apparatus lifetime. When corrosion proceeds, unexpected damage might be caused by the breakage of the apparatus, and corrosion protection measures are required from the viewpoint of safety. Therefore, the corrosion protection measures are taken for a variety of apparatuses used in an outdoor environment and a high temperature environment, and particularly for power plants.

The surface of a metal structural material of an apparatus to be used under a state of high temperature is generally covered with iron oxide such as $Fe_2O_3$. It is known that $Fe_2O_3$ has low solubility in water and anticorrosive effect when produced densely.

However, since the $Fe_2O_3$ film dissolves to disappear or its crystal system changes depending on the environment it is used, it might not be able to exhibit its original anticorrosion property. In view of such a problem, there is disclosed a method of the protection of the dissolution of the $Fe_2O_3$ film by using at least one of morpholine, alkanolamine and aliphatic cyclic amine as a pH adjuster to adjust the pH of water to which the $Fe_2O_3$ film is contacted. However, when the pH adjuster is used, its control is difficult, and there was a problem that the monitor of the corrosion was difficult.

There is also disclosed a method of protecting the corrosion of a boiler plant by controlling an amount of oxygen dissolved in the boiler, but there is no disclosure about the monitor of the corrosion protection of the $Fe_2O_3$ film.

DETAILED DESCRIPTION

According to one embodiment, there is provided a method for monitoring corrosion protection in a power plant, including: forming a film with a composition of $M1FeO_3$ (M1: trivalent or tetravalent metal) or $M2Fe_2O_4$ (M2: divalent metal) on an inner wall surface of each of apparatuses of the power plant; and maintaining the film stably by controlling an amount of introduction of oxygen into each of the apparatuses commensurate with a temperature in each of the apparatuses.

First Embodiment

Figure 1:
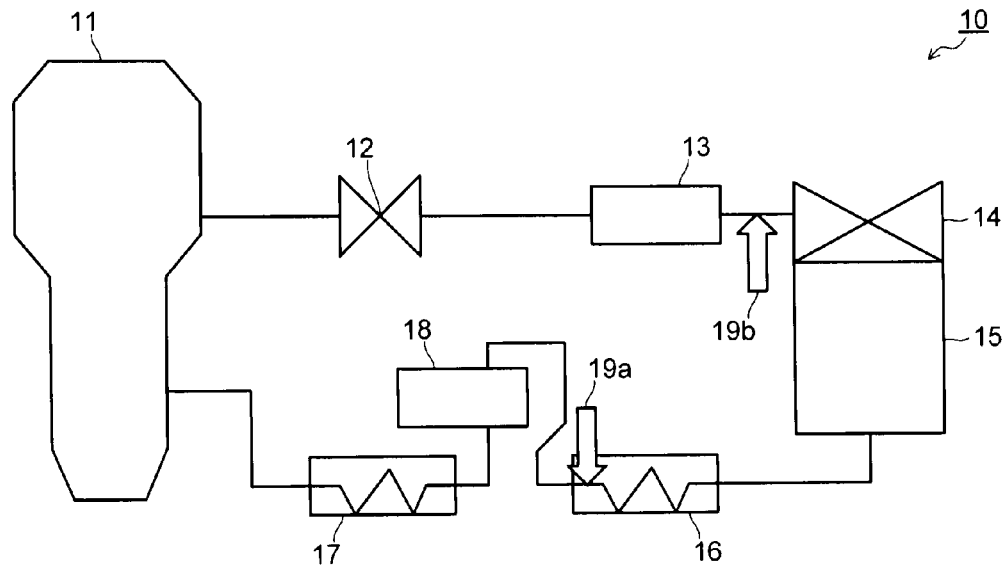
FIG. 1 is a system diagram of the pressurized water reactor according to a first embodiment.

FIG. 1 is a system diagram of a pressurized water reactor (hereinafter abbreviated as "PWR") according to this embodiment. In a PWR 10 of the embodiment shown in FIG. 1, a high-pressure turbine 12, a moisture separator/reheater 13, a low-pressure turbine 14 and a condenser 15 are sequentially connected to a steam generator (boiler) 11. Moreover, a low pressure feedwater heater 16 and a high pressure feedwater heater 17 are connected to the condenser 15, and the high-pressure feedwater heater 17 is connected to the steam generator 11. Furthermore, a degasifier 18 is disposed between the low pressure feedwater heater 16 and the high pressure feedwater heater 17.

For example, the PWR 10 can be operated as follows. Namely, the high-pressure turbine 12 is driven by steam generated by the steam generator 11. Then, the steam having driven the high-pressure turbine 12 is cooled down and is partly liquefied into water. Therefore, the steam is reheated by the moisture separator/reheater 13, and the liquefied water is vaporized and introduced into the low-pressure turbine 14 to drive the turbine 14. The steam which has driven the low-pressure turbine 14 is cooled by the condenser 15 and thus converted into water. The water is then heated through the low pressure feedwater heater 16 and the high pressure feedwater heater 17, introduced into the steam generator 11 and heated to be converted into steam again. The generated steam is introduced again into the high-pressure turbine 12 and the low-pressure turbine 14 to drive the turbines 12 and 14.

Figure 2:
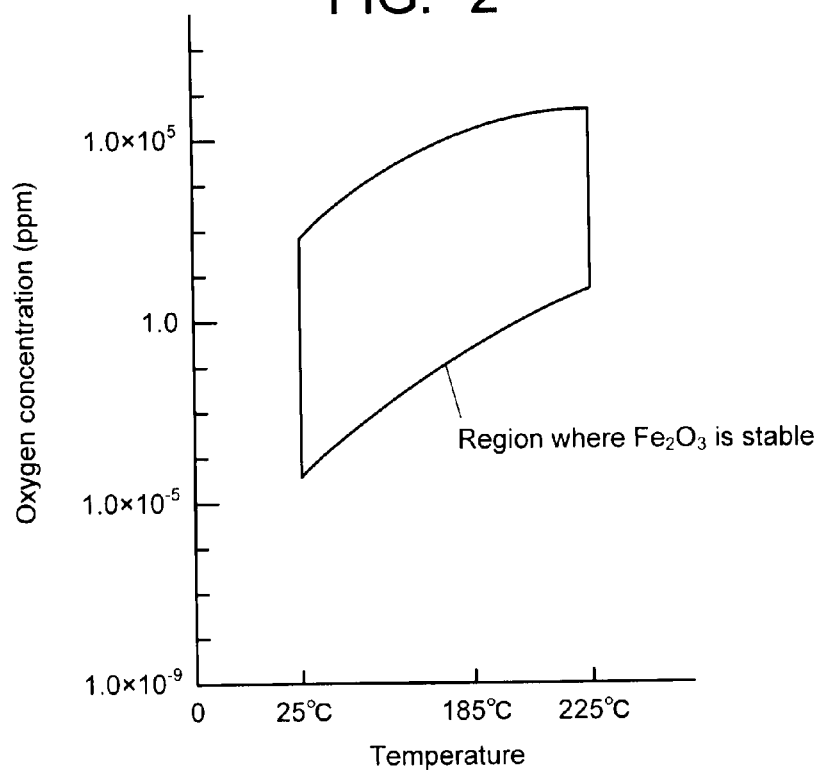
FIG. 2 is a graph showing an operation temperature and an oxygen introduction amount that can stabilize an $Fe_2O_3$ film.
Figure 3:
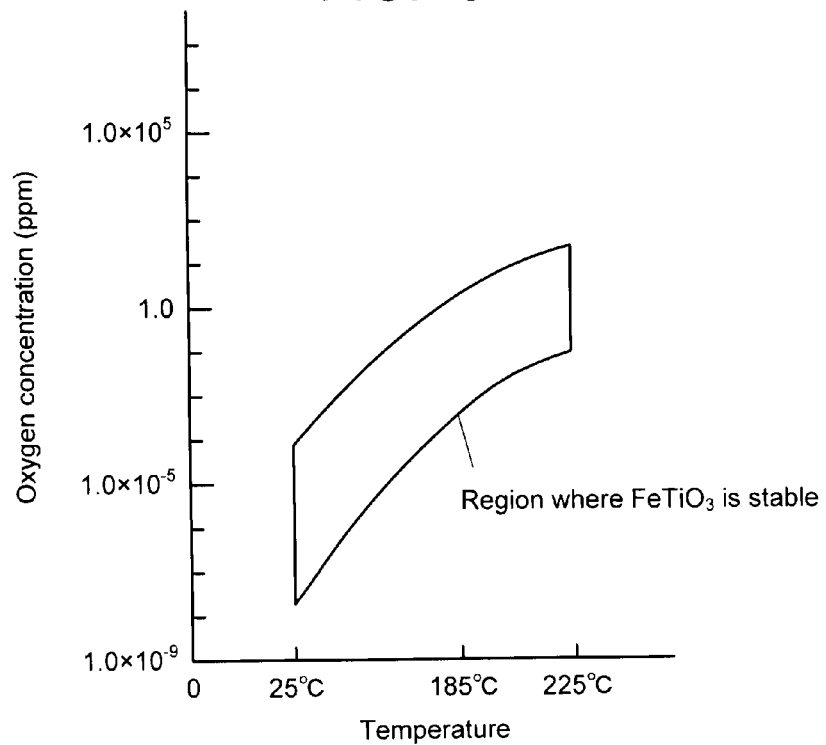
FIG. 3 is a graph showing an operation temperature and an oxygen introduction amount that can stabilize an $FeTiO_3$ film.

A method for monitoring corrosion protection in the PWR 10 shown in FIG. 1 is described below. FIG. 2 is a graph showing an oxygen concentration range in which an $Fe_2O_3$ film can be maintained stably within a range of 25° C. to 225° C., which is a typical operation temperature of the PWR 10. Moreover, FIG. 3 is a graph showing an oxygen concentration range in which an $FeTiO_3$ film can be maintained stably within a range of 25° C. to 225° C., which is a typical operation temperature of the PWR 10. Namely, as shown in FIG. 2 and FIG. 3, the $Fe_2O_3$ film and the $FeTiO_3$ film depend on the operation temperature and the amount of introduction of oxygen and can be maintained stably without being dissolved and corroded when the films are in the range surrounded by the curves and straight lines.

The $Fe_2O_3$ film and the $FeTiO_3$ film are conventionally known that their solubility in water is low and known as films which provide anticorrosive effect when formed densely.

The graphs shown in FIG. 2 and FIG. 3, that is, regions which depend on the operation temperature and the amount of introduction of oxygen under which the $Fe_2O_3$ film and the $FeTiO_3$ film can be maintained stably, are obtained by extensive research and devoted study performed by the present inventors.

Thus, it is seen that the $Fe_2O_3$ film and the $FeTiO_3$ film to be formed on the apparatuses of the PWR 10 shown in FIG. 1, that is, the power plant, can be maintained stably by controlling the amount of introduction of oxygen within the film stable region as shown in FIGS. 2 and 3 commensurate with the operation temperature. In other words, it is seen that the $Fe_2O_3$ film and the $FeTiO_3$ film used for the power plant can be maintained stably by a quite simple and easy method that controls the amount of introduction of oxygen within the film stable region commensurate with the operation temperature without using a chemical agent such as a pH adjuster which adversely affects the apparatuses. Therefore, it becomes possible to maintain the anticorrosion property of the PWR 10 under high reliability.

In this embodiment, in the application of corrosion protection to the PWR 10, the $Fe_2O_3$ film or the $FeTiO_3$ film is formed as the anticorrosive film on the inner wall surface of each of the apparatuses composing the PWR 10, that is, the inner wall surfaces of the steam generator 11 through the high pressure feedwater heater 17 and the degasifier 18.

Since each of the apparatuses contains iron, the $Fe_2O_3$ film can be formed by, for example, immersing each of the apparatuses in water that is held at pH 9.3 or more under atmosphere at room temperature, or by introducing oxygen into each of the apparatuses. Moreover, the $Fe_2O_3$ film can be formed naturally by arranging each of the apparatuses in such a condition as the $Fe_2O_3$ film can be maintained stably, the condition being set by adjusting the operation temperature as shown in FIG. 2, that is, the temperature of water or steam and adjusting the amount of introduction of oxygen.

The $FeTiO_3$ film is formed by directly coating the $FeTiO_3$ film or by coating the $TiO_2$ film or the like because each of the apparatuses composing the PWR 10 contains iron (Fe). In the latter case, iron ion or iron oxide contained in the structural material making each of the apparatuses is reacted with the $TiO_2$ film or the like and converted into the $FeTiO_3$ film.

Referring to FIG. 2 and FIG. 3, the operation temperature of the PWR 10, that is, the operation temperature of each of the apparatuses and the amount of introduction of oxygen in each of the apparatuses, are controlled so that the $Fe_2O_3$ film or the $FeTiO_3$ film can be maintained stably. In the PWR 10 shown in FIG. 1, the condenser 15 has the lowest operation temperature within a range of 25° C. to 50° C., and the steam generator 11 and the high pressure feedwater heater 17 have the highest operation temperature within a range of 200° C. to 225° C.

Therefore, when the $Fe_2O_3$ film is formed on the inner wall surface of the condenser 15, the amount of introduction of oxygen in the condenser 15 is controlled within a range of about $1.0 \times 10^{-5}$ ppm to $1.0 \times 10^2$ ppm with reference to FIG. 2. Meanwhile, when the $Fe_2O_3$ film is formed on the inner wall surface of the steam generator 11, the amount of introduction of oxygen into the steam generator 11 is controlled within a range of about $1.0 \times 10^{-1}$ ppm to $1.0 \times 10^5$ ppm.

Meanwhile, when the $FeTiO_3$ film is formed on the inner wall surface of the condenser 15, the amount of introduction of oxygen in the condenser 15 is controlled within a range of about $1.0 \times 10^{-8}$ ppm to $0.5 \times 10^{-4}$ ppm with reference to FIG. 3. Meanwhile, when the $FeTiO_3$ film is formed on the inner wall surface of the steam generator 11, the amount of introduction of oxygen into the steam generator 11 is controlled within a range of about $1.0 \times 10^{-6}$ ppm to 1.0 ppm.

As is apparent from the aforementioned description, it is required that the amount of introduction of oxygen is set larger as the operation temperature is set higher as in the steam generator 11 and the like. Therefore, when the amount of oxygen in the system of the PWR 10 is small, oxygen is supplied in order to set the amount of introduction of oxygen within the aforementioned range, e.g., at the position indicated by an arrow 19a in the drawing.

On the other hand, the amount of introduction of oxygen in the condenser 15 and the like must be decreased as the operation temperature is set lower therein. Therefore, if a large amount of oxygen is contained in the system of the PWR 10, for example, a reducing agent is supplied at the location indicated by an arrow 19b in the drawing to reduce the amount of oxygen contained in the system, thereby setting the amount of introduction of oxygen in the above-described range.

As is apparent from FIG. 2 and FIG. 3, the margin of the $Fe_2O_3$ film relating to the amount of introduction of oxygen is set larger than the margin of the $FeTiO_3$ film relating to the amount of introduction of oxygen. For example, therefore, when the $Fe_2O_3$ film is formed for all of the apparatuses of the PWR 10 under the condition that the amount of introduction of oxygen into the PWR 10 is 1.0 ppm, the $Fe_2O_3$ film is maintained stably at the operation temperature of each of the apparatuses. Therefore, the anticorrosion property of the PWR 10 can be held under high reliability.

For example, when the amount of introduction of oxygen is set to $5 \times 10^{-3}$ ppm for the $FeTiO_3$ film, the $FeTiO_3$ film can be maintained stably in a relatively large operation temperature range of 100° C. to 150° C. Therefore, if there are a plurality of apparatuses having respective operation temperatures within a range of 100° C. to 150° C., the $FeTiO_3$ film can be maintained stably by setting the amount of introduction of oxygen to $5 \times 10^{-3}$ ppm for the apparatuses.

In the PWR 10 shown in FIG. 1, the high-pressure turbine 12, the moisture separator/reheater 13, and the low pressure feedwater heater 16 are operated in the above temperature range, that is, in the temperature range of 100° C. to 150° C.

It is not required that in the PWR 10 the $Fe_2O_3$ film or the $FeTiO_3$ film is formed on the inner wall surfaces of all of the apparatuses uniformly, but the $Fe_2O_3$ film may be used for some of the apparatuses and the $FeTiO_3$ film for the other apparatus.

In this embodiment, although the $Fe_2O_3$ film or the $FeTiO_3$ film was used as a film to be formed on the inner wall surfaces of the apparatuses of the PWR 10, the present embodiment is not limited to the above description and can be also applied to a film with a composition of a general formula $M1FeO_3$ (M1: trivalent or tetravalent metal) or $M2Fe_2O_4$ (M2: divalent metal). As the metal M1 in this case, Y and La can be exemplified as the trivalent metal, and Ti, Zr and Hf can be exemplified as the tetravalent metal. As the metal M2, Ni, Co, Mn and the like can be exemplified.

Second Embodiment

Figure 4:
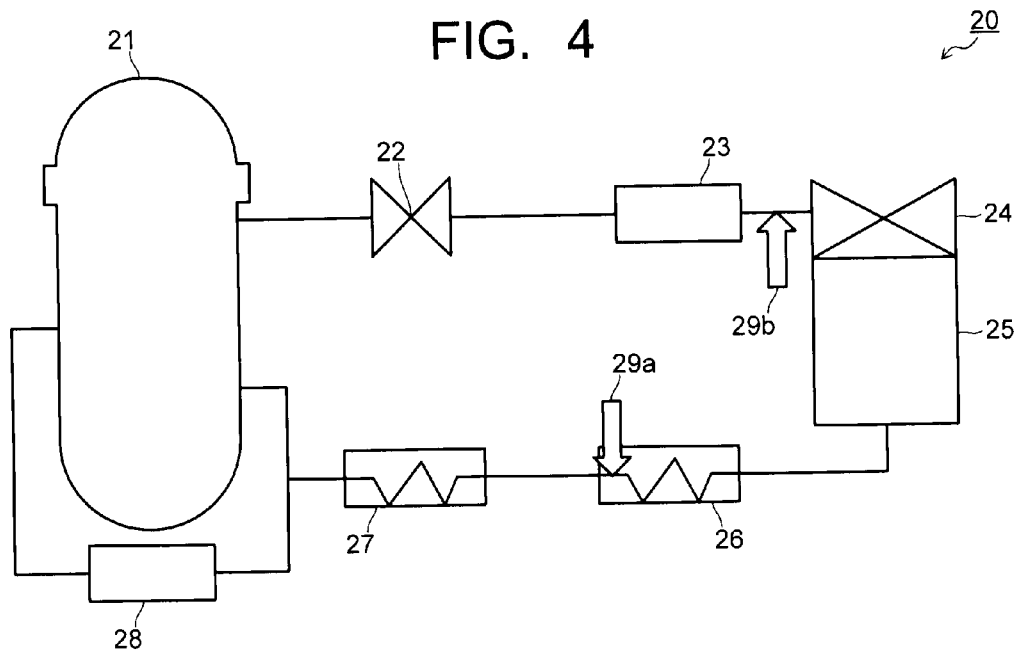
FIG. 4 is a system diagram of a boiling-water reactor according to a second embodiment.

FIG. 4 is a system diagram of a boiling-water reactor (hereinafter abbreviated as "BWR") according to this embodiment. In a BWR 20 of this embodiment shown in FIG. 4, a high-pressure turbine 22, a moisture separator/reheater 23, a low-pressure turbine 24 and a condenser 25 are sequentially connected to a nuclear reactor 21. Moreover, a low pressure feedwater heater 26 and a high pressure feedwater heater 27 are connected to the condenser 25, and the high pressure feedwater heater 27 is connected to the nuclear reactor 21. The nuclear reactor 21 is provided with a reactor water cleanup system 28.

For example, the BWR 20 can be operated as follows. Namely, the high-pressure turbine 22 is driven by steam generated by the nuclear reactor 21. Then, the steam having driven the high-pressure turbine 22 is cooled down and is partly liquefied into water, so that the steam is reheated by the moisture separator/reheater 23, and the liquefied water is vaporized and introduced into the low-pressure turbine 24 to drive the turbine 24. The steam which has driven the low-pressure turbine 24 is cooled by the condenser 25 to be converted into water. The water is then heated through the low pressure feedwater heater 26 and the high pressure feedwater heater 27 and introduced into the nuclear reactor 21 to be converted into steam again. The generated steam is introduced again into the high-pressure turbine 22 and the low-pressure turbine 24 to drive the turbines 22 and 24.

A method for monitoring corrosion protection in the BWR 20 shown in FIG. 4 is described below, but is basically same as that of the PWR 10 shown in FIG. 1 except that the apparatuses are somewhat different from the ones in the PWR 10.

Namely, a typical operation temperature of the BWR 20 shown in FIG. 4 can be also set to a temperature range of 25° C. to 225° C. substantially same as that of the PWR 10. Therefore, a range of oxygen concentration in which the $Fe_2O_3$ film can be maintained stably at every operation temperature can be recognized by referring to FIG. 2, and a range of oxygen concentration in which the $FeTiO_3$ film can be maintained stably at every operation temperature can be recognized by referring to FIG. 3.

Depending on whether the film formed on the inner wall surface of each of the apparatuses of the BWR 20 shown in FIG. 4 is the $Fe_2O_3$ film or the $FeTiO_3$ film, therefore, the amount of introduction of oxygen in which the $Fe_2O_3$ film and the $FeTiO_3$ film are maintained stably at the operation temperature of each of the apparatuses is identified by referring to FIG. 2 and FIG. 3, and the $Fe_2O_3$ film and the $FeTiO_3$ film formed on the inner wall surface of each of the apparatuses can be maintained stably by setting the amount of introduction of oxygen to the identified amount of oxygen.

In other words, it is seen that the $Fe_2O_3$ film and the $FeTiO_3$ film to be used for the power plant can be maintained stably by an extremely simple method that controls the operation temperature and the amount of introduction of oxygen without using a chemical agent such as a pH adjuster which is difficult in control. As a result, the anticorrosion property of the BWR 20 can be held under high reliability.

For example, the condenser 25 has the lowest operation temperature within a range of 25° C. to 50° C., and the nuclear reactor 21 and the high pressure feedwater heater 27 have the highest operation temperature within a range of 200° C. to 225° C.

Therefore, when the $Fe_2O_3$ film is formed on the inner wall surface of the condenser 25, the amount of introduction of oxygen is set within a range of about $1.0 \times 10^{-5}$ ppm to $1.0 \times 10^{2}$ ppm with reference to FIG. 2. Meanwhile, when the $Fe_2O_3$ film is formed on the inner wall surface of the nuclear reactor 21, the amount of introduction of oxygen in the nuclear reactor 21 is set within a range of about $1.0 \times 10^{-1}$ ppm to $1.0 \times 10^{5}$ ppm.

When the $FeTiO_3$ film is formed on the inner wall surface of the condenser 25, the amount of introduction of oxygen in the condenser 25 is set within a range of about $1.0 \times 10^{-8}$ ppm to $0.5 \times 10^{-4}$ ppm with reference to FIG. 3. On the other hand, when the $FeTiO_3$ film is formed on the inner wall surface of the nuclear reactor 21, the amount of introduction of oxygen in the nuclear reactor 21 is set within a range of about $1.0 \times 10^{-6}$ ppm to 1.0 ppm.

It is required that the amount of introduction of oxygen is set larger as the operation temperature is set higher as in the nuclear reactor 21 or the like. Therefore, when the amount of oxygen contained in the system of the BWR 20 is small, oxygen is supplied, e.g., at the position indicated by an arrow 29a in the drawing in order to set the amount of introduction of oxygen in the above range.

Meanwhile, it is required that the amount of introduction of oxygen is set smaller as the operation temperature is lower as in the condenser 25 and the like. Therefore, if a large amount of oxygen is contained in the system of the BWR 20, for example, a reducing agent is supplied at the location indicated by an arrow 29b in the drawing to reduce the amount of oxygen contained in the system, thereby setting the amount of introduction of oxygen in the above-described range.

It is to be understood that other characteristics and advantages are similar to those of the PWR 10 in the first embodiment related to FIG. 1, and their descriptions will be omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for corrosion protection of an apparatus in a power plant, the method comprising:
    forming a film with a composition of $FeYO_3$, $FeLaO_3$, $FeTiO_3$, $FeZrO_3$, $FeHfO_3$, or $Fe_2TiO_4$ on an inner wall surface of the apparatus of the power plant; and
    controlling an amount of introduction of oxygen into the apparatus commensurate with a temperature of the apparatus.

2. The method according to claim 1,
    wherein the film is formed by coating the film with the composition on the inner wall surface of the apparatus under the control of the temperature in the apparatus and the control of the amount of introduction of oxygen into the apparatus.

3. The method according to claim 1, wherein the power plant is a pressurized water reactor plant or a boiling-water reactor plant.

4. The method according to claim 1, wherein the power plant is a pressurized water reactor plant or a boiling-water reactor plant, and the amount of introduction of oxygen is $5 \times 10^{-3}$ ppm.

5. The method according to claim 1, wherein when the film is formed on the inner wall surface of a condenser of the power plant, an amount of introduction of oxygen into the condenser is within a range of $1.0 \times 10^{-8}$ ppm to $0.5 \times 10^{-4}$ ppm.

6. The method according to claim 1, wherein when the film is formed on the inner wall surface of a steam generator of the power plant, an amount of introduction of oxygen into the steam generator is within a range of $1.0 \times 10^{-6}$ ppm to 1.0 ppm.

* * * * *